United States Patent [19]

Rampf

[11] Patent Number: 4,463,500
[45] Date of Patent: Aug. 7, 1984

[54] WELDING-WIRE FEED MONITOR

[75] Inventor: Herbert Rampf, Unterschleissheim, Fed. Rep. of Germany

[73] Assignee: Linde Aktiengesellschaft, Wiesbaden, Fed. Rep. of Germany

[21] Appl. No.: 406,875

[22] Filed: Aug. 10, 1982

[30] Foreign Application Priority Data

Aug. 14, 1981 [DE] Fed. Rep. of Germany ....... 3132240

[51] Int. Cl.³ .............................................. G01B 3/12
[52] U.S. Cl. ........................................ 33/129; 33/133
[58] Field of Search ............. 33/127, 129, 133, 143 L, 33/147 L; 242/47, 54 R

[56] References Cited

U.S. PATENT DOCUMENTS

| 316,887 | 4/1885 | Frye | 33/189 |
| 1,647,127 | 11/1927 | Fitch | 33/129 |
| 2,876,549 | 3/1959 | Adamson et al. | 33/129 |
| 3,131,479 | 5/1964 | Somogye | 33/129 |
| 3,916,174 | 10/1975 | Moule | 33/129 |

Primary Examiner—Willis Little
Attorney, Agent, or Firm—Karl F. Ross; Herbert Dubno

[57] ABSTRACT

A device for monitoring the movement (advance or velocity) of an electrode wire comprising a measuring roller against which the wire is urged by a pressing roller flanked by a pair of grooves in a housing. The wire is captured in these guide grooves by a jaw carried by a lever swung in the housing, thereby greatly simplifying the opening and closing movements of the device.

8 Claims, 3 Drawing Figures

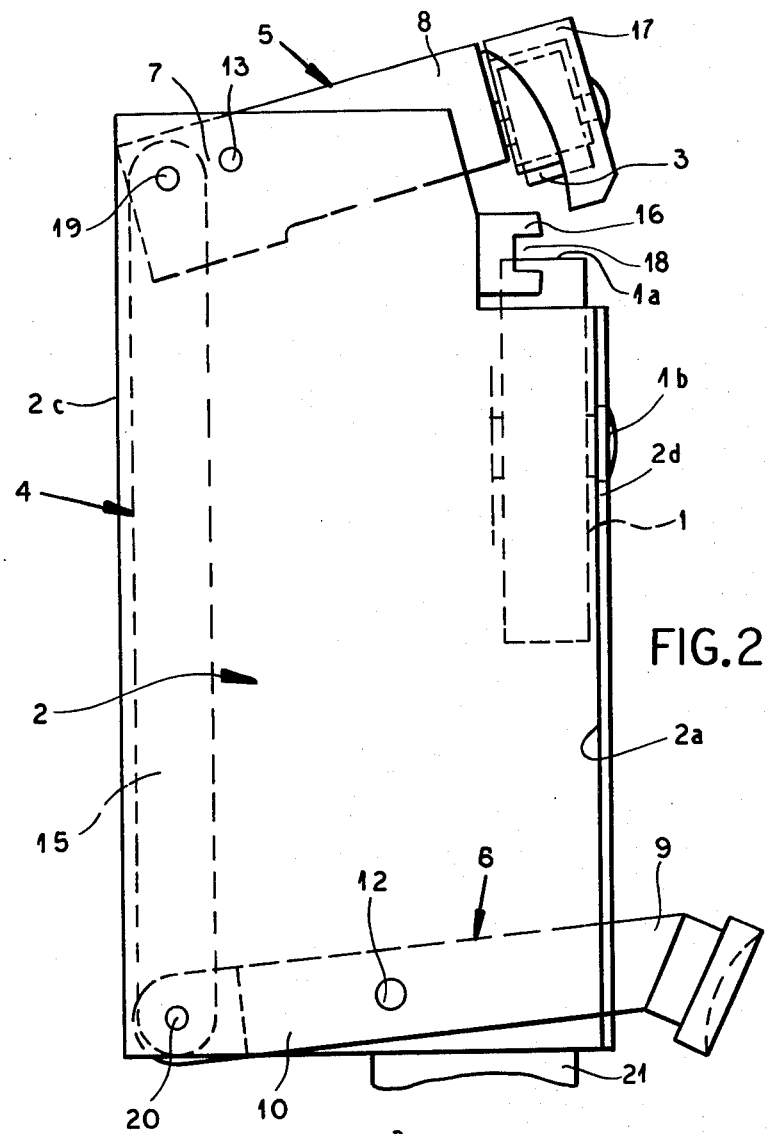
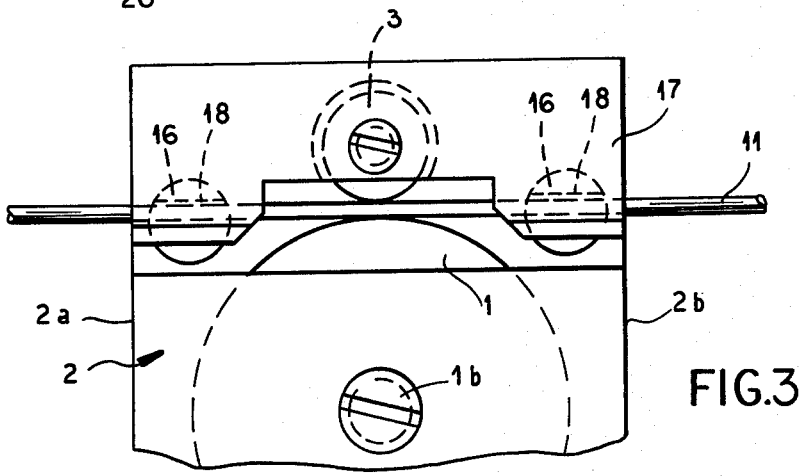

WELDING-WIRE FEED MONITOR

FIELD OF THE INVENTION

My present invention relates to a monitoring device capable of responding to the advance of a welding wire and/or to the speed of a welding wire for a welding machine or station utilizing the wire as a filler wire or consumable electrode. More particularly, the invention relates to a device for measuring the advance or speed of a welding wire by causing the wire to entrain a measuring roller which can be connected to a signal generator whose output represents the advance of the wire or its speed.

BACKGROUND OF THE INVENTION

In many welding applications, the feeding of a welding wire, i.e. a wire which can be melted to form the weldment (filler wire) or a wire which is used as an electrode to strike the arc, must be monitored with care to ensure, for example, a constant feed rate.

Monitoring devices are provided for this purpose on welding machines and can be a measuring roller or wheel against which the welding wire is displayed and which can be pressed against this wheel by a pressure roller.

The measuring roller or wheel is coupled to a signal generator, usually a pulse generator, which can produce a pulse for each increment or advance of the wire. The number of pulses thus represents the length of wire fed and the frequency or cadence of the pulses, i.e. the number of pulses per unit time, can represent the speed of the wire. Each pulse also represents an increment of angular displacement of the measuring wheel or roller and a constant rate of pulse generation can signal a constant speed of the wire.

If the pulses are counted or otherwise accumulated in a pulse counter, the total value will represent the weld material consumed in a particular process.

Earlier monitoring devices were relatively complex and had a particular problem in that it was difficult to insert the wire into the monitoring device, particularly when the wire had to be threaded through wire guides fore and aft of the measuring roller.

In one conventional system for this purpose, to insert the wire into the guide grooves on either side of the measuring and pressing rollers, it was necessary to loosen a pair of screws which held guide plates in place, to shift these plates until the grooves were exposed, to insert the wire and pass it between the rollers, and to replace the plates and the screws.

This process was time-consuming and had to be repeated each time a fresh length of wire was supplied to the welding site.

OBJECTS OF THE INVENTION

It is the principal object of the present invention to provide a welding wire monitor for the purposes described which permits more rapid insertion or removal of a welding wire and thereby conserves time and effort in the welding process.

Another object of this invention is to provide an improved monitoring device for the speed and velocity of a welding wire which greatly simplifies the introduction of the wire into the device and especially into guides thereof.

Still another object of the invention is to provide an improved easily operated, simple and readily maintainable welding-wire monitor.

SUMMARY OF THE INVENTION

These objects and others which will become apparent hereinafter are attained in accordance with the present invention in a welding wire displacement and speed monitoring device which comprises a housing provided with a measuring roller or wheel, a pressing roller to hold the welding wire against the measuring roller which can be provided with a signal generator producing an output representing the angular displacement of the measuring roller and hence of the welding wire in contact therewith, and wire guides flanking the measuring roller at least in the region of contact of the wire therewith and including grooves in which the wire can be received.

According to the invention, the housing is provided with a lever pivotally mounted about an axis generally parallel to the direction of wire displacement through the device. At its end remote from this axis the lever is provided with jaws cooperating with the guide for retaining the wire in the respective grooves so that, upon a pivotal movement of the lever, the jaws swing away to clear the grooves and allow insertion of the wire into the grooves.

According to a feature of the invention, the pressing roller is also mounted on this end of the lever and is flanked by the jaws. The lever is swingable between two limiting positions, e.g. by an actuating mechanism. In one of those limiting positions, i.e. the open position, the guide grooves are open toward a side of the housing and the wire can be inserted into these grooves. In the other or closed position, the jaws cooperate with the groove-carrying members to entrap the wire in the grooves.

For insertion of the wire, therefore, it is merely necessary to operate the actuator, e.g. by hand, to lift the end of the lever and shift the latter into its open position.

According to yet another feature of the invention, the actuator includes a further lever which is fulcrumed in the housing and has a handle which projects therefrom and is engageable by the hand of the user. This actuating lever can be connected to the first mentioned lever by a link articulated to both levers. The handle can be actuated readily by only one hand of the operator so that the other hand can be used to insert the welding wire.

A spring can be provided in the housing and biases the actuating system so as to close the grooves, the spring being compressed for opening of the grooves. So that the angular displacement of the lever provided with the jaws can be held as small as possible, it has been found to be advantageous to shift the pivot axis of this lever toward the actuating end of this lever or, put otherwise, to provide the actuator more closely to the fulcrum of this lever than are the jaws. In this case the actuating arm is significantly shorter than the actuated arm.

BRIEF DESCRIPTION OF THE DRAWING

The above and other objects, features and advantages of the present invention will become more readily apparent from the following description, reference being made to the accompanying drawing in which:

FIG. 2 is a side elevational view showing the device of FIG. 1 in an open position; and FIG. 3 is a front view of a portion of the device showing the lever in a closed position.

SPECIFIC DESCRIPTION

Figure 1:
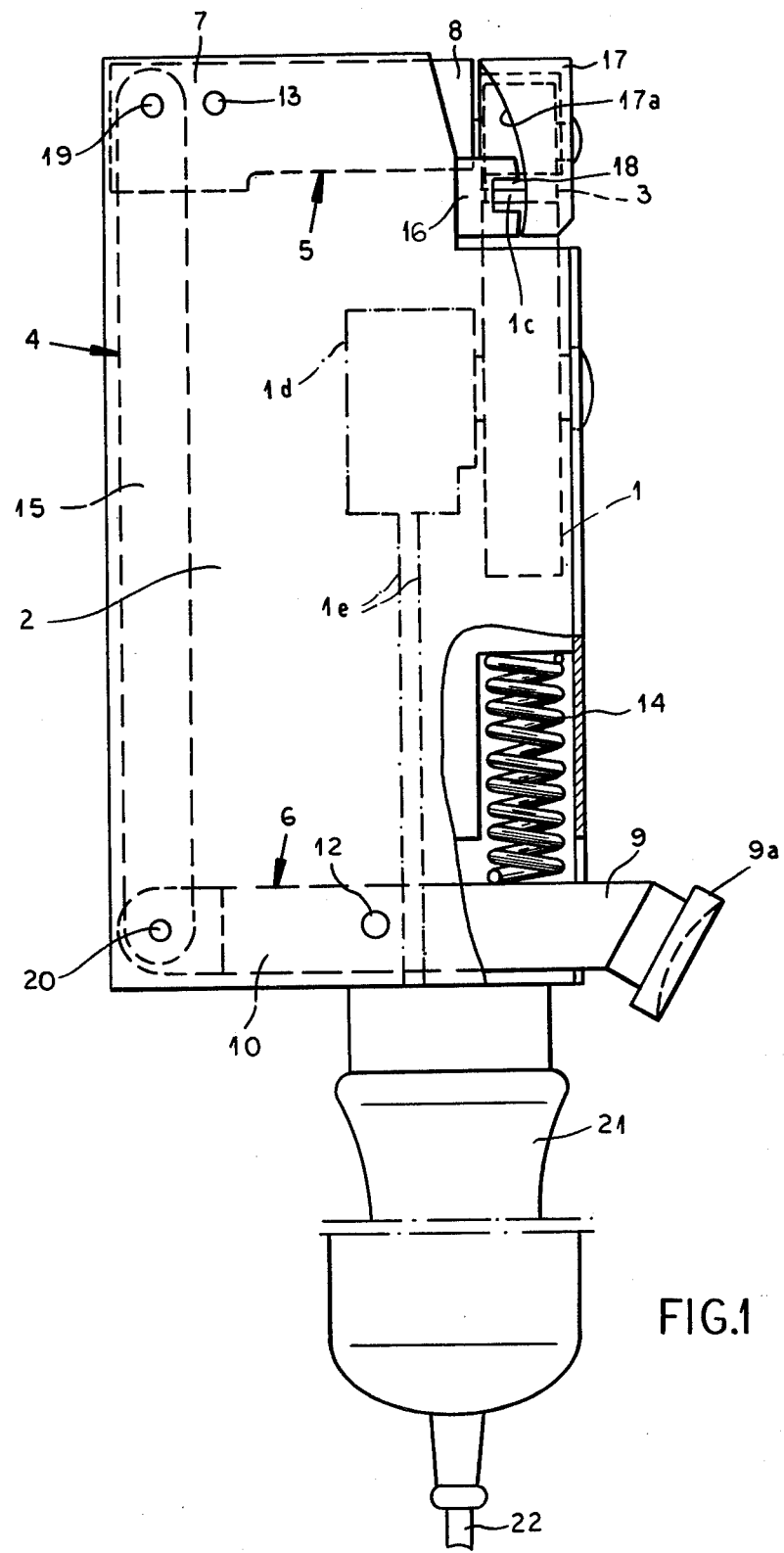
FIG. 1 is a side elevational view partly in diagrammatic form and partly broken away of a monitoring device embodying the present invention.

As can be seen from FIG. 1, the device comprises a housing 2 having a pair of narrow lateral walls 2a, 2b, a full height rear wall 2c and a somewhat shortened front wall 2d, the latter terminating below the upper portion 1a of a measuring roller 1 which is journaled by a pin 1b in the housing. The roller 1 is connected with a signal generator 1d which outputs to leads 1e a train of pulses at a frequency representing the velocity of a wire electrode 1c which is passed through the monitoring device. The leads 1e are passed through an insulating structure 21 which also forms a handle in case the device must be hand-held from which the conductor 22 emerges.

A lever 5 is fulcrumed at 13 within the housing, the axis of the fulcrum parallel to the wire and being located to the left-hand end of the lever 5 than to the right-hand end. To this end, the lever 5 has two lever arms 7 and 8, the former being for shorter than the latter.

At the end of the lever arm 8 there is provided a jaw 17 with a pair of curved jaw surfaces 17a which are juxtaposed with the open end of a pair of guide grooves 18 formed on members 16 which project toward the member 17a. When the grooves receive a wire electrode which is shown for the electrode 1c in FIG. 1, the surfaces 17a cooperate with the ends of members 16 to trap the electrode in the grooves. The jaw 17 carries a pressing roller which is mounted to rotate parallel to roller 1 in the position shown in FIG. 3.

The actuating system for the lever 5 comprises, as can be seen at 4, a lever arrangement. A link 15 is articulated at 19 to the lever 5 at a location close to the fulcrum 13 so that the end carrying the jaw 17 swings significantly even for a small angular displacement of the lever 5.

The opposite end of the link 15 is articulated at 20 to an actuating lever 6 fulcrumed at 12 within the housing and having two lever arms 9 and 10 which are about the same length. A finger-operated button or handle 9a is provided at the free end of the arm 9 and can be engaged by a finger, e.g. the thumb of the user, when he is holding handle 21.

A compression tube coil spring 14 bears upon the lever 6 and tends to rotate in the clockwise sense and to rotate the lever 5 in a similar sense. The spring maintains the grooves 18 close until member 9a is actuated against the force of the spring 14.

When the lever 6 is actuated, by pressing member 9a upwardly, the lever 5 is swung into its open position unblocking the grooves 18, and permitting the welding wire to be inserted into the grooves and over the top of the wheel 1.

When the lever 6 is released, the spring 14 closes the lever 5 and brings the wheel 3 against the welding wire, thereby clamping the welding wire between the wheels and ensuring that any further movement of the welding wire will result in entrainment of the wheel 1 and a corresponding output of the signal generator 1b. Obviously, this system allows high-speed one-hand opening and closing of the device so that the other hand can be utilized to let in the electrode wire.

I claim:

1. A device for monitoring the movement of an electrode wire, comprising:
   a housing;
   a measuring roller journaled in said housing for rotation about a roller axis and adapted to indicate displacement of an electrode wire pressed against said roller;
   a guide fixed in said housing and disposed along at least one side of said roller and having a groove open outwardly to receive a wire in contact with said roller;
   a pressing roller in said housing for pressing said wire against said measuring roller, said housing being formed with an end swingable between an open and closed position about an axis perpendicular to said roller axis; and
   a jaw on said end of said lever blocking escape of said wire from said groove and juxtaposed with said guide in said closed position.

2. A device for monitoring the movement of an electrode wire, comprising:
   a housing;
   a measuring roller journaled in said housing for rotaiton about a roller axis and adapted to indicate displacement of an electrode wire pressed against said roller;
   a guide fixed in said housing and disposed along at least one side of said roller and having a groove open outwardly to receive a wire in contact with said roller;
   a pressing roller in said housing for pressing said wire against said measuring roller, said housing being formed with a lever having an end swingable between an open and closed position about an axis perpendicular to said roller axis; and
   a jaw on said end of said lever blocking escape of said wire from said groove and juxtaposed with said guide in said closed position, said pressing roller being mounted on said jaw and being swung away from said measuring roller upon operation of said lever to unblock escape of said wire from said groove.

3. The apparatus defined in claim 2, further comprising an actuating mechanism in said housing for shifting said lever between said open and closed positions.

4. The apparatus defined in claim 3 wherein said actuating mechanism includes a link articulated to said lever, and to a further lever angularly displaceable in said housing and manually actuatable at a location externally of said housing.

5. The apparatus defined in claim 2, further comprising a spring in said housing operatively connected to said lever and biasing same into a position wherein said groove is closed by said jaw.

6. The mechanism defined in claim 4 wherein a spring is provided in said housing and acts upon said mechanism to urge the first-mentioned lever into a groove-closing position.

7. The apparatus defined in claim 4 wherein said link is articulated to a relatively short arm of the first-mentioned lever, said jaw being provided on a long arm thereof.

8. The apparatus defined in claim 4, claim 5 or claim 6 wherein a pair of grooves are provided to flank said measuring roller, said jaw having a pair of arcuate surfaces respectively disposed to close said grooves, said pressing roller being located between said surfaces.

* * * * *